(12) United States Patent  
Ely et al.

(10) Patent No.: US 8,112,568 B1  
(45) Date of Patent: Feb. 7, 2012

(54) CABLE PRESENCE DETECTION SYSTEM

(75) Inventors: Richard I. Ely, Sunnyvale, CA (US); Mark Lipford, Sunnyvale, CA (US); George Feltovich, Sunnyvale, CA (US); Robert Clark, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1236 days.

(21) Appl. No.: 11/879,897

(22) Filed: Jul. 19, 2007

(51) Int. Cl.  
*G06F 13/00* (2006.01)

(52) U.S. Cl. ................... 710/300; 710/104; 710/301

(58) Field of Classification Search .......... 710/300, 710/301, 104  
See application file for complete search history.

(56) References Cited

U.S. PATENT DOCUMENTS

| | | | |
|---|---|---|---|
| 4,068,221 A * | 1/1978 | McClintock ............. | 340/604 |
| 6,847,330 B2 * | 1/2005 | Rada et al. ............. | 343/702 |
| 6,868,468 B2 * | 3/2005 | Boz et al. ............. | 710/304 |
| 6,892,263 B1 * | 5/2005 | Robertson ............. | 710/301 |
| 7,296,107 B2 * | 11/2007 | Lunsford et al. ....... | 710/304 |
| 7,352,289 B1 * | 4/2008 | Harris ............. | 340/870.07 |
| 7,426,585 B1 * | 9/2008 | Rourke ............. | 710/8 |
| 7,624,203 B2 * | 11/2009 | Blinick et al. ....... | 710/16 |
| 2004/0011403 A1 * | 1/2004 | Martin ............. | 137/312 |

* cited by examiner

*Primary Examiner* — Mark Rinehart  
*Assistant Examiner* — Jeremy S Cerullo  
(74) *Attorney, Agent, or Firm* — Suiter Swantz pc llo

(57) ABSTRACT

The present invention is a system and method for detecting the presence of a cable in a connector. The system may comprise one or more of the following features: (a) a first circuit contact; (b) a second circuit contact; (c) a first capacitive element; (d) an electrical ground; (e) a voltage source; and (f) a logical output. The second circuit contact may be connected to ground. The capacitive element may be driven to ground by connection of the first and second circuit contacts to corresponding cable contacts.

13 Claims, 4 Drawing Sheets

CABLE PRESENCE DETECTION SYSTEM

FIELD OF THE INVENTION

The present invention generally relates to the field of inter-device connections and more specifically, to a system and method for detecting the presence of a cable in a connector.

BACKGROUND OF THE INVENTION

A computing system may use an interface to connect to one or more peripheral devices, such as data storage devices, printers, scanners and the like. The interface typically includes a data communication bus that attaches and allows orderly communication among the devices and the computing system. A system may include one or more communication buses. In many systems a logic chip, known as a bus controller, monitors and manages data transmission between the computing system and the peripheral devices by prioritizing the order and the manner of device control and access to the communication buses. Control rules, also known as communication protocols, are imposed to promote the communication of information between computing systems and peripheral devices. For example, Small Computer System Interface (SCSI) is an interface, widely used in computing systems, such as desktop and mainframe computers, that enables connection of multiple peripheral devices to a computing system.

SCSI is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners, and optical drives (CD, DVD, etc.). The SCSI standard contains definitions of command sets of specific peripheral device types; the presence of "unknown" as one of these types means that in theory it can be used to interface almost any device, but the standard is highly pragmatic and addressed toward commercial requirements.

In computer hardware, Serial Attached SCSI (SAS) is a computer bus technology primarily designed for transfer of data to and from devices such as hard drives, CD-ROM drives and so on. SAS is a serial communication protocol for direct attached storage (DAS) devices. It is designed as a replacement for parallel SCSI, allowing for much higher speed data transfers than previously available, and is backwards-compatible with Serial Advanced Technology Attachment (SATA drives). Though SAS uses serial communication instead of the parallel method found in traditional SCSI devices, it still uses SCSI commands for interacting with SAS end devices. SAS protocol is developed and maintained by T10, a technical committee of the International Committee for Information Technology Standards (INCITS). The current draft revision of the SAS protocol can be found in the *Working Draft—American National Standard: Project T10/1760-D*, Revision 5a, Jul. 21, 2006, and is incorporated herein by reference.

SUMMARY OF THE INVENTION

The present invention is directed to a cable presence detection system.

In an embodiment of the present invention, a cable detection system may comprise: (a) a connector comprising: (i) a plurality of connector contacts; (ii) a ground plane; (iii) a capacitive element electrically coupled between a connector contact of the plurality of connector contacts and the ground plane; (iv) a voltage source; (b) a cable connector comprising: (i) a plurality of cable contacts; (ii) a common ground line electrically coupling the plurality of cable contacts; and (c) a voltage measurement mechanism.

In a further embodiment of the invention, a connection apparatus adapted for detecting the presence of a cable may comprise: (a) a first circuit contact; (b) a second circuit contact; (c) a first capacitive element; (d) an electrical ground; (e) a voltage source; and (f) a logical output.

In still a further embodiment of the invention, a method for detecting the presence of a cable may comprise the steps: (a) electrically coupling a capacitive element between a first connector contact and a ground; (b) electrically coupling a second connector contact to the ground; (c) applying a voltage to a node defined by the first contact and the capacitive element; (d) electrically coupling a first cable contact and a second cable contact; (e) connecting the first connector contact to the first cable contact; (f) connecting the second connector contact to the second cable contact; and (g) verifying that the first connector contact has contacted the first cable contact and the second connector contact has contacted the second cable contact.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention is directed to a detection system capable of determining whether or not a cable is properly connected to a device. The system may comprise a voltage source which may be may be coupled to ground upon the connection of a cable connector to a device connector or another cable connector via an adapter/extender, thereby providing a measurable indicator of connection status.

Reference will now be made in detail to the presently preferred embodiments of the invention, examples of which are illustrated in the accompanying drawings.

Figure 1:
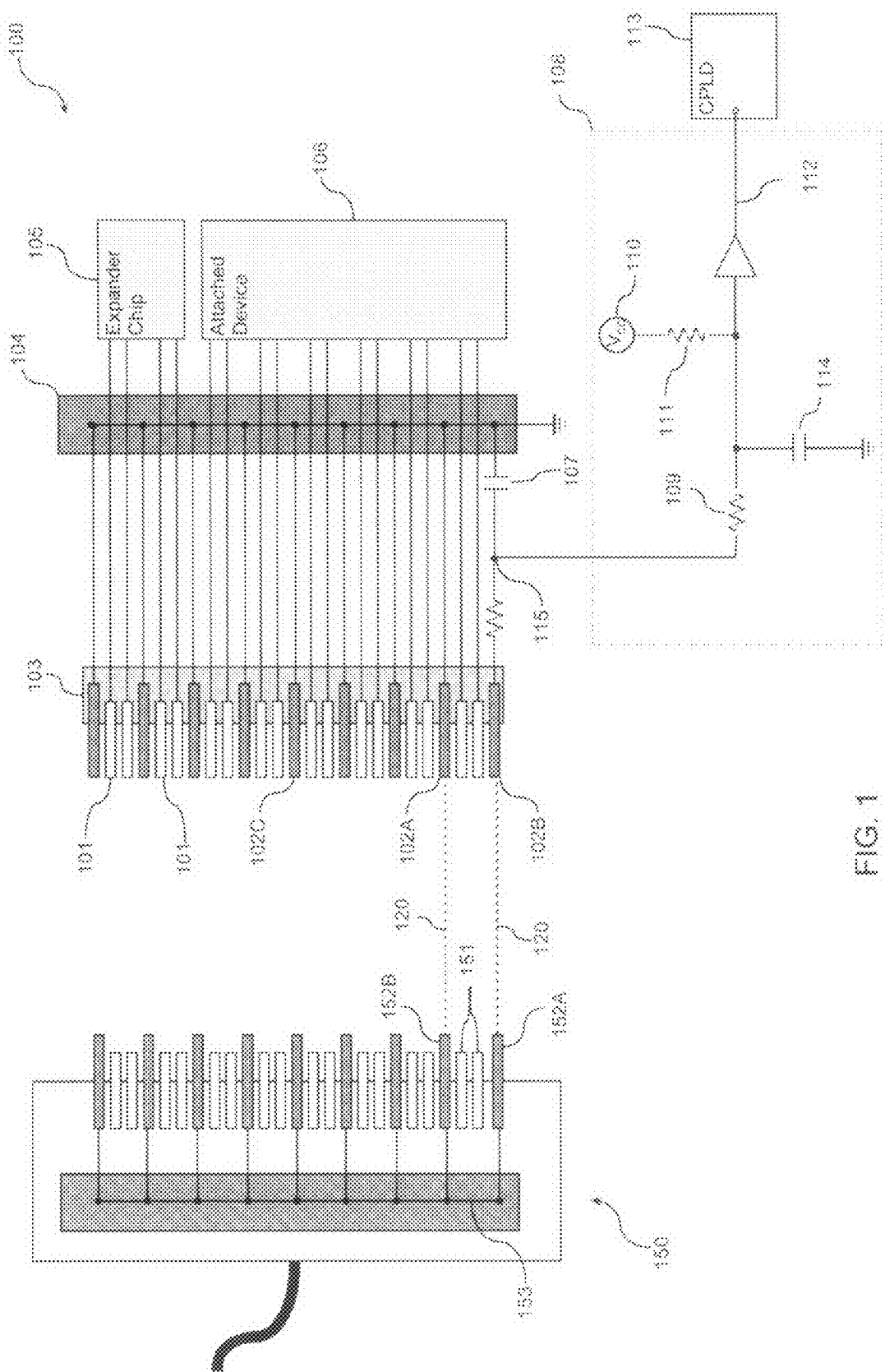
FIG. 1 illustrates a cable connector having cable detection circuitry according to an embodiment of the invention.

In FIG. 1, a connector 100 is shown. The connector 100 may comprise a plurality of signal contacts (or pins) 101 and ground contacts (or pins) 102 capable of coupling to a corresponding plurality of conductors in a cable. A substrate 103 supports the plurality of contacts 101, 102 and an insulating layer may encase at least a portion of the individual contacts 101, 102.

In an illustrative embodiment, the connector 100 comprises two or more ground contacts 102. Two or more ground contacts 102A, 102B may be connected to a common printed circuit board ground plane 104. The signal contacts 101 may be routed to an expander chip 105 or to an attached device 106. A capacitive element 107 may be inserted between ground pin 102B and the ground plane 104, thereby defining a circuit node 115 between the ground pin 102B and the capacitive element. The capacitive element 107 may have a capacitance of from about 0.001 to 0.1 μF. Detection circuitry 108 is connected to circuit node 115. The detection circuitry 108 may comprise a voltage source 110 (having an output voltage $V_{cc}$) and a pull-up resistor 111. The cable-presence signal represented by output voltage 112 from the detection circuitry 108 may be routed to a complex programable logic device (CPLD) 113 or other device for further processing.

When no cable is present, ground pin 102B is unconnected and the capacitive element 107 is charged to voltage $V_{cc}$. In such a case, the CPLD 113 will read an output voltage 112 equal to $V_{cc}$ corresponding to a logical HIGH value.

A corresponding cable connector 150 may be disposed within the connector 100 so as to link 120 one or more devices via the cable. Cable connector 150 may comprise a plurality of cable ground pins 152 connected to a common ground plane 153. When cable connector 150 is linked to connector 100, the ground pins 152 of the cable connector 150 make electrical contact with ground pins 102A, 102B of the connector 100. Such a configuration couples pin 102B to the ground plane 104 via cable ground pin 152A, common ground line 153, cable ground pin 152B, and connector ground pin 102A.

The grounding of pin 102B may allow any accumulated charge to drain from the capacitive element 107 through the ground plane 104. In such a case, the CPLD 113 will read an output voltage 112 corresponding to a logical LOW. It will be readily recognized by one skilled in the art that the capacitive element 107 may be disposed adjacent to any ground pin 102. However, it may be preferable to connect the detection circuitry 108 to a ground pin 102C located near the center of the connector 100. Such a configuration may serve to prevent a situation where connectors 100 and 150 are only partially attached at one end and yet still have sufficient pin contacts to link the detection circuitry 108 to ground.

In a further embodiment, the cable detection circuit may comprise a electro static discharge (EDS) mitgation mechanism. The ESD mitigation mechanism may include a second resistive element 109 and a second capacitive element 114 connected to ground. Such circuit elements may serve to protect the circuit from an electrostatic discharge (ESD) that may be generated by any disparate electrical potentials existing between the connector 100 and the cable connector 150.

In still a further embodiment, a ferrite bead may be incorporated into either the cable, the cable connector, the connector, or the cable detection circuit so as to prevent undesired electromagnetic interference emissions.

Figure 2A:
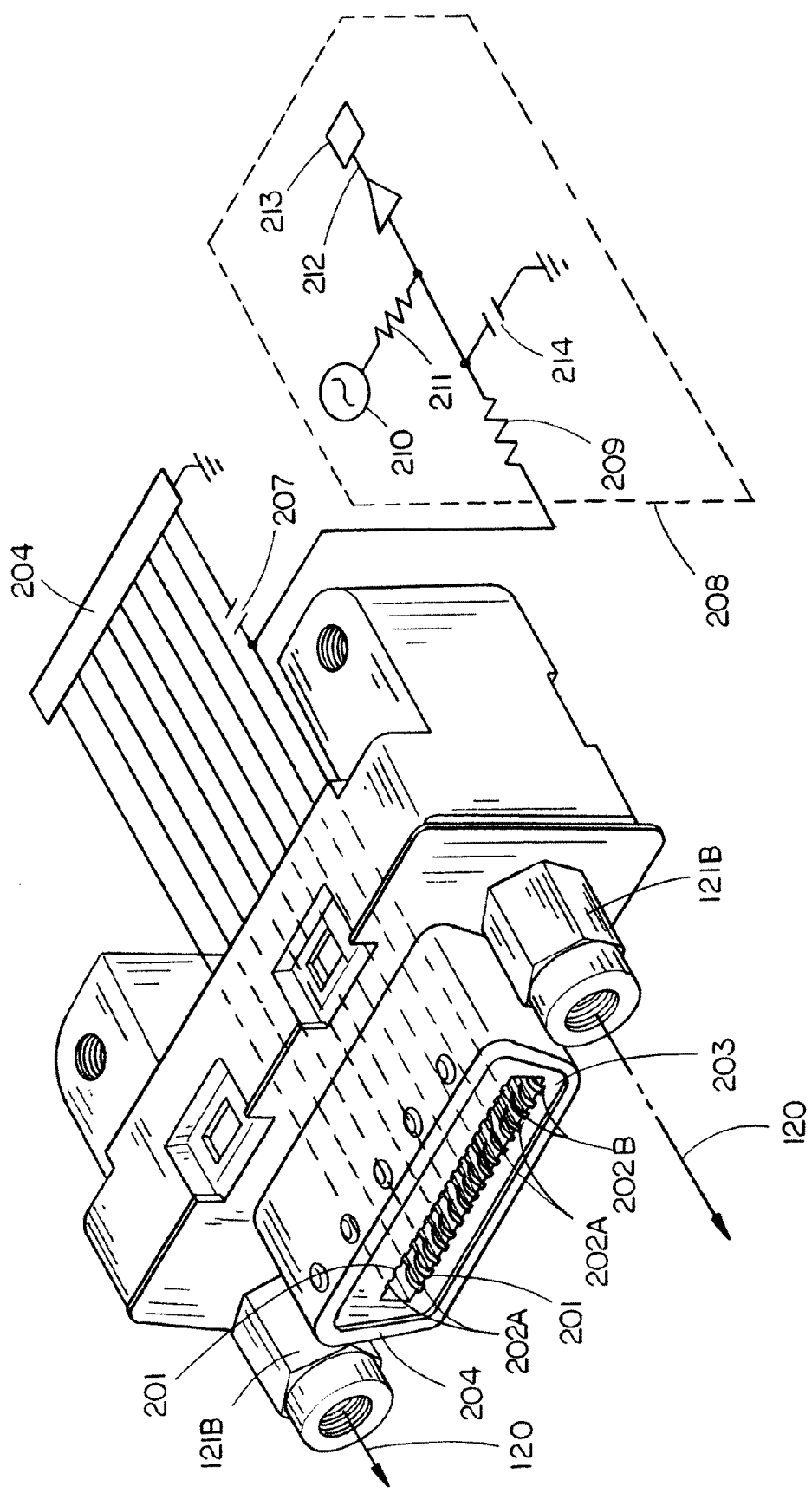
FIG. 2A illustrates an SAS-compatible cable connector having cable detection circuitry according to an embodiment of the invention.
Figure 2B:
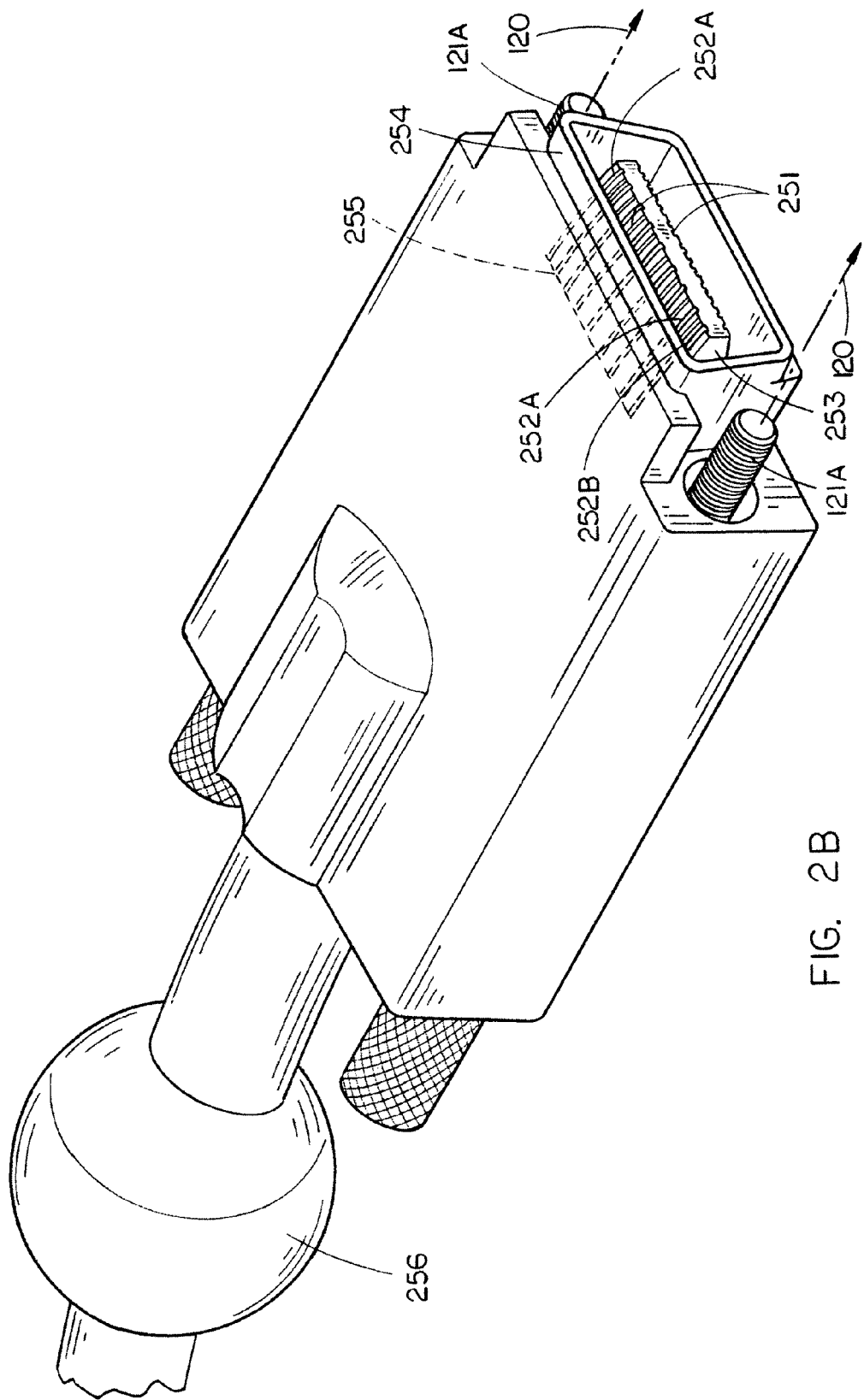
FIG. 2B illustrates an SAS-compatible cable according to an embodiment of the invention.

Referring to FIGS. 2A and 2B, an SAS 4x-specific implementation of a cable detection circuit is presented. However, it should be readily apparent to one skilled in the art that the present invention may be incorporated into any SAS compliant connectors including, but not limited to, mini-SAS connectors.

In FIG. 2A, a connector 200 is shown. The connector 200 may comprise a plurality of signal contacts (or pins) 201 and ground contacts (or pins) 202 capable of coupling to a corresponding plurality of conductors in a cable. A substrate 203 supports the plurality of contacts 201, 202 and an insulating layer 204 may encase at least a portion of the individual contacts 201, 202.

In an illustrative embodiment, the connector 200 is a female connector comprising one or more ground contacts 202. Two or more ground contacts 202A, 202B may connected to a common printed circuit board ground plane 204. A capacitive element 207 is inserted between ground pin 202B and the ground plane 204. Detection circuitry 208 is connected to a node defined by the capacitive element 207 and a ground pin 202B. The detection circuitry 208 may comprise a voltage source 210 (having an output voltage $V_{cc}$) and a pull-up resistor 211. The cable-presence signal represented by output voltage 212 from the detection circuitry 208 may be routed to a CPLD 213 other device for processing.

When no cable is present, ground pin 202B is unconnected and the capacitive element 207 is charged to voltage $V_{cc}$. In such a case, the CPLD 213 will read an output voltage 112 equal to $V_{cc}$ and corresponding to a logical HIGH value.

Referring to FIGS. 2A and 2B, a male connector 250 may be disposed within the female connector 200 so as to link 120 one or more devices. Such link 120 may be accomplished via mutually threaded coupling members 121A and 121B.

Referring to FIG. 2B, the male connector 150 may comprise a plurality of cable signal pins 251 and cable ground pins 252. The cable ground pins 252 may be connected to a common ground line 255. A substrate 253 may support the plurality of contacts 251, 252. An insulating layer 254 may encase at least a portion of the individual contacts 251, 252.

When male connector 250 is linked 120 to female connector 200, the ground pins 252A, 252B of the male connector may make electrical contact with ground pins 202A and 202B, respectively, of the female connector. Such a configuration routes pin 202B to the ground plane 204 via male ground pin 252B, common ground line 255, male ground pin 252A, and female ground pin 202A.

The grounding of pin 202B allows any accumulated charge to drain from the capacitive element 207. In such a case, the CPLD 213 will read an output voltage 212 corresponding to a logical LOW.

In a further embodiment, the cable detection circuit may comprise a second resistive element 209 and a second capacitive element 214 connected to ground. Such circuit elements may serve to protect the circuit from an electrostatic discharge (ESD) that may be generated by any disparate electrical potentials existing between the female connector 200 and the male connector 250.

In still a further embodiment, a ferrite bead 256 may be incorporated into either the cable (shown in FIG. 2B), the male connector, the female connector, or the cable detection circuit, so as to protect the connector and cable connectors from possible electromagnetic interference (EMI).

It should be noted that the designations of "female" and "male" as applying to various connectors are merely for descriptive purposes. Embodiments where a cable connector or a device connector are either a male or a female-type connector are envisioned by the invention.

Furthermore, while the above description has been made in reference to a cable/device connection detection system, the present invention may also be implemented in a cable/cable connection detection configuration. In such a configuration, one or more instances of the detection circuitry may be disposed within a cable adapter/extender whereby two cable connectors may be linked. As such, the connections status of each connection in a multiple cable configuration may be independently monitored. It should be noted that, as with the cable/device connection detection system, embodiments where a cable connector or a cable adapter/extender are either a male or a female-type connector are envisioned by the invention.

Figure 3:
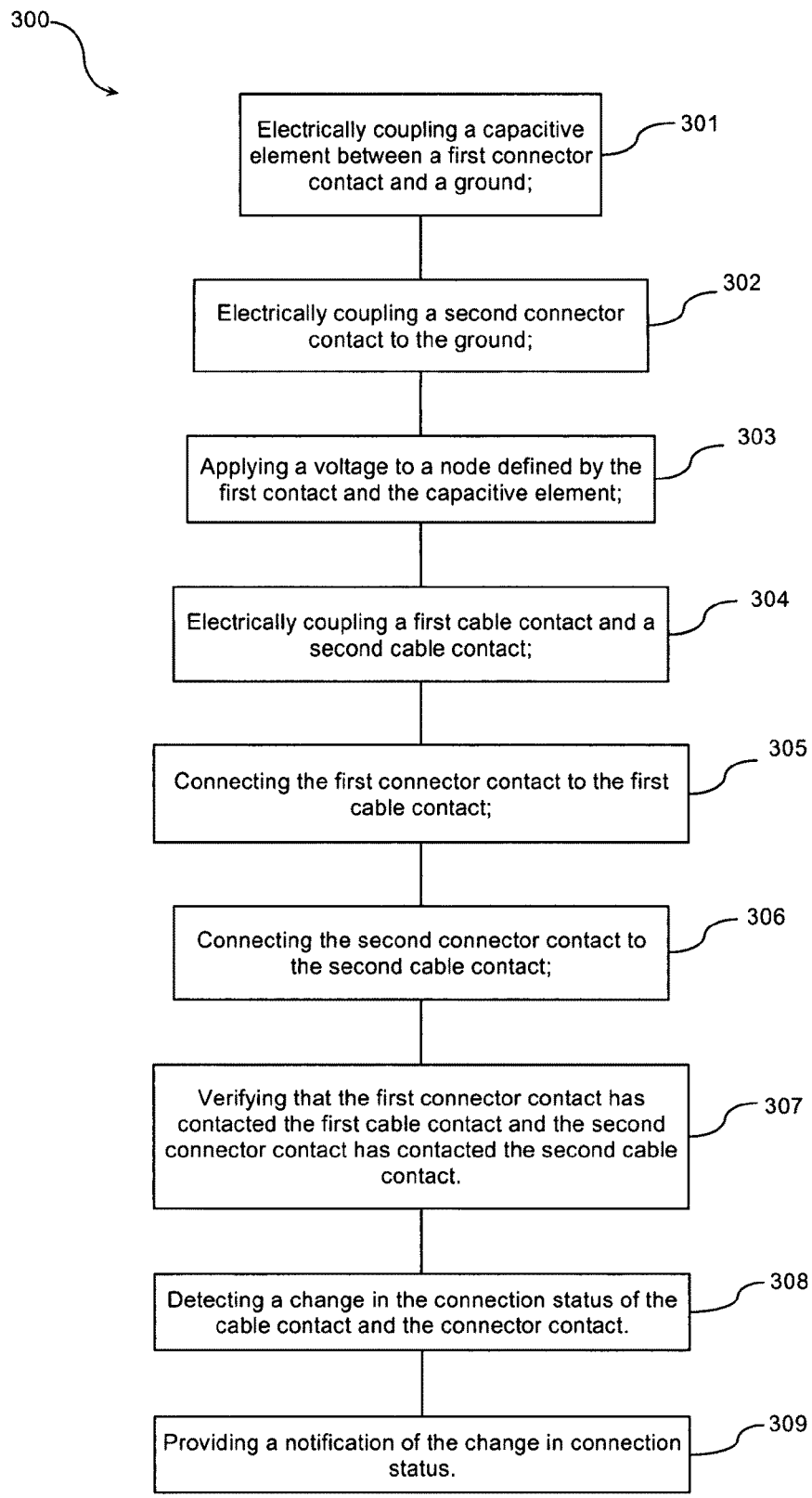
FIG. 3 illustrates a method for detecting the presence of a cable in a connector according to an embodiment of the invention.

Referring to FIG. 3, a process flowchart illustrating a method for detecting the presence of a cable attached to a connector in accordance with the present invention is disclosed. A capacitive element may be electrically coupled between a connector contact and a circuit ground at step 301, thereby defining a circuit node between the connector contact and the capacitive element. A second connector contact may be coupled to the circuit ground at step 302. A voltage source may be connected to the node defined by the connector and the capacitive element and a voltage applied. This voltage application charges the capacitive element up to the applied voltage.

A first cable contact and a second cable contact may be electrically coupled at step 304. The first cable contact and second cable contact may comprise cable grounds and may be linked via a common ground plane or circuit. When the cable is attached to the connector, the first and second connector contacts are allowed to contact the first and second cable contacts, respectively, at steps 305 and 306. Assuming complete contact is achieved between the first and second connector contacts and the first and second cable contacts, the capacitive element is linked to ground and any charge which had accumulated on the capacitive element is dissipated.

Verification that the first and second connector contacts have contacted the first and second cable contacts may occur at step 307. This verification may occur by measuring the voltage at the node defined by the first connector contact and the capacitive element. If the cable is successfully connected, the node defined by the first connector contact and the capacitive element should be drawn to ground via the circuit line created by the first and second connector contacts and the first and second cable contacts, thereby resulting in a logical "low" voltage value at the node. However, if the cable is not connected, the node will not be drawn to ground and a logical "high" voltage value will exist at the node due to voltage applied at step 303. It should be noted that the designations "high" and "low" voltage are intended as being merely descriptive of values having differing voltages. Embodiments where a "high" voltage value indicates a connected cable while a "low" voltage indicates a disconnected cable are fully contemplated by the present invention. Further, the terms "high" voltage and "low" voltage may each refer to a respective range of voltages where values in each range correspond to a given connections status.

The measured voltage at the node may be output from the detection circuitry to a processing device, such as a CPLD, so that the logical value representing the connections status may be used by the processing device. Once the connection status has been determined, a notification of that status may be provided at steps 308 and 309. Such notification may be triggered by detecting 308 a change in the voltage measured at step 307. In a particular embodiment, a transition from a "high" voltage to a "low" voltage as measured by the CPLD may indicate the connection of a cable while a transition from a "low" voltage to a high voltage may indicate the disconnection of a cable.

Following such a transition, this status information may be conveyed to a user by a notification mechanism at step 309. Such a notification mechanism may be incorporated into a device connected via a cable, a display apparatus coupled to the device, or to the connector itself. The notification mechanism may comprise application specific integrated circuitry (ASIC) or software-based environmental monitoring systems configured to provide an audio or visual notification of the connection status to a user. Such mechanisms may further include indicator LEDs, LCD screens, computer monitors, audio speakers, and the like, which are controlled by the ASIC or software to provide such reports.

In further embodiments, the specific nature of the notification may be further specified by the status of the connection detection circuitry in combination with additional diagnostic information, such as data transfer status. For example, the system may detect that a cable is disconnected and that a data link could not be initialized. Such a situation may indicate that the cable is, in fact, disconnected and a notification may be provided to a user check the connection. Alternately, the system may detect that a cable is connected but a data link could not be initialized. Such a situation may indicate that the cable itself or a device connected to the cable is malfunctioning and the user may be directed to check the propriety of the cable and/or devices themselves.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A connection apparatus adapted for detecting the presence of a cable, the apparatus comprising:
   a connector comprising:
      a plurality of connector contacts;
      a ground plane;
      a capacitive element electrically coupled between a connector contact of the plurality of connector contacts and the ground plane; and
      detection circuitry including a voltage source, the detection circuitry configured to apply a voltage to a node located between the capacitive element and the connector contact of the plurality of connector contacts;
   a cable connector comprising:
      a plurality of cable contacts; and
      circuitry electrically coupling the plurality of cable contacts; and
   a voltage measurement mechanism;
   wherein operably coupling the connector and the cable connector electrically couples the node located between the capacitive element and the connector contact of the plurality of connector contacts to the ground plane of the connector via at least one cable contact.

2. The apparatus of claim 1, wherein the connector and the cable connector are SAS compatible.

3. The apparatus of claim 2, wherein the connector and the cable connector are SAS 4x compatible.

4. The apparatus of claim 2, wherein the connector and the cable connector are mini-SAS compatible.

5. The apparatus of claim 1, wherein the connector further comprises: a first resistive element.

6. The apparatus of claim 1, wherein connector further comprises an electrostatic-discharge dissipation element.

7. The apparatus of claim 6, wherein the electrostatic-discharge dissipation element comprises: a second resistive element; and
   a second capacitive element.

8. The apparatus of claim 1, further comprising:
   an electromagnetic interference prevention element.

9. The apparatus of claim 8, wherein the electromagnetic interference prevention element comprises: a ferrite bead.

10. The apparatus of claim 1, wherein the voltage measurement mechanism is a complex programmable logic device.

11. A method for detecting the presence of a cable, the method comprising the steps:

electrically coupling a capacitive element between a first connector contact and a ground;

electrically coupling a second connector contact to the ground;

applying a voltage to a node defined by the first connector contact and the capacitive element;

electrically coupling a first cable contact and a second cable contact;

connecting the first connector contact to the first cable contact;

connecting the second connector contact to the second cable contact; and verifying that the first connector contact has contacted the first cable contact and the second connector contact has contacted the second cable contact.

12. The method of claim 11, wherein the step of verifying that the first connector contact has contacted the first cable contact and the second connector contact to the second cable contact comprises the step:

measuring the voltage at the node defined by the first contact and the capacitive element.

13. The method of claim 12, further comprising the step:
detecting a change in the voltage at the node; and
providing a notification of the change in voltage.

* * * * *